(12) United States Patent
Ikeda et al.

(10) Patent No.: US 9,327,622 B2
(45) Date of Patent: May 3, 2016

(54) LOAD TRANSFER STRUCTURE AGAINST SIDE IMPACT

(71) Applicant: Nissan Motor Co., Ltd., Kanagawa (JP)

(72) Inventors: Taiji Ikeda, Kanagawa (JP); Tatsuzo Tomita, Kanagawa (JP); Masato Sakurai, Kanagawa (JP); Toshiya Sagara, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/397,064

(22) PCT Filed: Apr. 15, 2013

(86) PCT No.: PCT/JP2013/061198
§ 371 (c)(1),
(2) Date: Oct. 24, 2014

(87) PCT Pub. No.: WO2013/161611
PCT Pub. Date: Oct. 31, 2013

(65) Prior Publication Data
US 2015/0123434 A1    May 7, 2015

(30) Foreign Application Priority Data

Apr. 27, 2012   (JP) ................................ 2012-102920

(51) Int. Cl.
*B60N 2/42* (2006.01)
*B60N 2/68* (2006.01)
*B62D 25/04* (2006.01)

(52) U.S. Cl.
CPC ............. *B60N 2/4235* (2013.01); *B60N 2/4249* (2013.01); *B60N 2/68* (2013.01); *B62D 25/04* (2013.01)

(58) Field of Classification Search
CPC .......... B60N 2/06; B60N 2/42; B60N 2/4235; B60N 2/427; B60N 2/42727; B60N 2/42736; B60N 2/42745; B60N 2/68; B60R 21/05; B62D 25/04

See application file for complete search history.

(56) References Cited

U.S. PATENT DOCUMENTS 4,512,604 A * 4/1985 Maeda et al. ................. 296/68.1
5,000,509 A * 3/1991 Sinnhuber et al. ........ 296/187.12
(Continued)

FOREIGN PATENT DOCUMENTS

CN         102310794 A      1/2012
DE         19521888 A1 *  11/1996 .............. B60R 21/02
(Continued)

OTHER PUBLICATIONS

International Preliminary Report on Patentability issued in Application No. PCT/JP2013/061198, mailed on Nov. 6, 2014 (8 pages).
(Continued)

*Primary Examiner* — Glenn Dayoan
*Assistant Examiner* — Paul Chenevert
(74) *Attorney, Agent, or Firm* — Osha Liang LLP

(57) ABSTRACT

A load transfer structure includes a seatback frame, and a load receiving member disposed on the seatback frame to contact with a side wall of a vehicle body when the side wall is moved toward a vehicle cabin by a side impact. The load receiving member includes a horizontal portion extending laterally, an inclined portion extended obliquely outward and upward from an outer end of the horizontal portion, and a curved portion provided between the horizontal portion and the inclined portion and having inner and outer concave edges. A bisector of an angle between straight edges continued from both ends of the outer concave edge and a bisector of an angle between straight edges continued from both ends of the inner concave edge intersect with each other in the curved portion. Accordingly, an absorbed energy amount by the load receiving member increases.

13 Claims, 4 Drawing Sheets

(56) References Cited

U.S. PATENT DOCUMENTS

| | | | |
|---|---|---|---|
| 5,407,244 A * | 4/1995 | Nakano et al. | 296/68.1 |
| 5,435,618 A * | 7/1995 | Sacco et al. | 296/187.12 |
| 5,584,525 A * | 12/1996 | Nakano et al. | 296/68.1 |
| 5,671,968 A * | 9/1997 | Masuda et al. | 296/187.12 |
| 5,984,402 A * | 11/1999 | Takeuchi | 296/187.12 |
| 6,073,992 A * | 6/2000 | Yamauchi et al. | 296/203.01 |
| 6,237,991 B1 * | 5/2001 | Weber | 296/187.12 |
| 6,279,990 B1 * | 8/2001 | Miyasaka et al. | 296/203.03 |
| 6,299,238 B1 * | 10/2001 | Takagi et al. | 296/187.12 |
| 6,299,239 B1 * | 10/2001 | Sagawa et al. | 296/187.12 |
| 6,332,643 B1 * | 12/2001 | Sukegawa et al. | 296/203.03 |
| 6,450,574 B1 * | 9/2002 | Umezawa et al. | 297/216.13 |
| 6,474,726 B1 * | 11/2002 | Hanakawa et al. | 296/191 |
| 6,761,402 B1 * | 7/2004 | Muraishi | 297/216.1 |
| 7,246,845 B2 * | 7/2007 | Rashidy et al. | 296/187.12 |
| 7,854,470 B2 * | 12/2010 | Yamaki et al. | 296/187.12 |
| 7,857,377 B2 * | 12/2010 | Chen et al. | 296/203.03 |
| 8,033,602 B2 * | 10/2011 | Yamaki et al. | 297/216.13 |
| 8,038,201 B2 * | 10/2011 | Torii | 296/187.12 |
| 8,061,763 B2 * | 11/2011 | Melz et al. | 296/187.03 |
| 8,079,635 B2 * | 12/2011 | DeVor et al. | 296/187.08 |
| 8,226,156 B2 * | 7/2012 | Shiono et al. | 296/193.02 |
| 8,419,113 B2 * | 4/2013 | Kunishi et al. | 296/193.06 |
| 8,602,492 B2 * | 12/2013 | Nakaya et al. | 297/216.13 |
| 8,668,225 B2 * | 3/2014 | Yamaki et al. | 280/730.2 |
| 8,690,255 B2 | 4/2014 | Yamaki et al. | |
| 8,827,362 B2 * | 9/2014 | Yamaki et al. | 297/216.13 |
| 8,851,556 B2 * | 10/2014 | Nishimura et al. | 296/193.06 |
| 8,911,004 B2 * | 12/2014 | Yao | 296/193.06 |
| 9,010,855 B2 * | 4/2015 | Yamaki et al. | 297/216.13 |
| 2001/0004161 A1 * | 6/2001 | Son | 296/203.03 |
| 2005/0023862 A1 * | 2/2005 | Saeki | 296/187.12 |
| 2005/0151363 A1 * | 7/2005 | Saeki | 280/784 |
| 2006/0038428 A1 * | 2/2006 | Song | 296/187.12 |
| 2006/0202513 A1 * | 9/2006 | Matsuda | 296/187.12 |
| 2006/0208537 A1 * | 9/2006 | Dingman et al. | 296/193.05 |
| 2008/0036235 A1 * | 2/2008 | Ameloot et al. | 296/102 |
| 2009/0250967 A1 * | 10/2009 | Bodin | 296/187.01 |
| 2010/0038928 A1 * | 2/2010 | Onuma | 296/187.12 |
| 2011/0127802 A1 * | 6/2011 | Kim et al. | 296/203.03 |
| 2011/0133515 A1 * | 6/2011 | Mori | 296/193.06 |
| 2011/0193378 A1 * | 8/2011 | Kalinowski | 297/216.13 |
| 2011/0241384 A1 * | 10/2011 | Mori | 296/193.06 |
| 2011/0298267 A1 * | 12/2011 | Yamaki et al. | 297/391 |
| 2012/0193954 A1 * | 8/2012 | Sakkinen et al. | 297/216.13 |
| 2013/0187409 A1 * | 7/2013 | Moll | 296/193.06 |
| 2015/0028627 A1 * | 1/2015 | Fellague | 296/187.13 |

FOREIGN PATENT DOCUMENTS

| | | | | |
|---|---|---|---|---|
| DE | 102013017269 A1 * | 8/2014 | | B62D 25/04 |
| EP | 0753450 A1 * | 1/1997 | | B62D 21/15 |
| EP | 0953495 A2 * | 11/1999 | | B62D 25/04 |
| EP | 1170197 A2 * | 1/2002 | | B62D 25/04 |
| EP | 1231130 A1 * | 8/2002 | | B62D 25/04 |
| EP | 1247724 A2 * | 10/2002 | | B62D 25/04 |
| EP | 2420432 A1 * | 2/2012 | | B62D 25/06 |
| FR | 2979608 A1 * | 3/2013 | | B62D 21/15 |
| JP | 2617077 B2 * | 6/1997 | | B60N 2/22 |
| JP | 2009006894 A * | 1/2009 | | B60N 2/42 |
| JP | 2011-025827 A | 2/2011 | | |
| WO | WO 2008037350 A1 * | 4/2008 | | B62D 21/15 |
| WO | WO 2008061931 A1 * | 5/2008 | | B62D 25/04 |
| WO | 2011/017435 A1 | 2/2011 | | |
| WO | 2011/152530 A1 | 12/2011 | | |
| WO | WO 2011151962 A1 * | 12/2011 | | B62D 25/04 |
| WO | WO 2012035662 A1 * | 3/2012 | | B62D 25/04 |
| WO | WO 2014017961 * | 1/2014 | | B62D 25/04 |

OTHER PUBLICATIONS

International Search Report issued in PCT/JP2013/061198 mailed on Jul. 16, 2013 (2 pages).

Written Opinion of the International Searching Authority issued in PCT/JP2013/061198 mailed on Jul. 16, 2013 (3 pages).

* cited by examiner

LOAD TRANSFER STRUCTURE AGAINST SIDE IMPACT

CROSS-REFERENCE TO RELATED APPLICATIONS

This application claims priority to Japanese Patent Application 2012-102920, filed on Apr. 27, 2012, and is a national phase application of PCT Patent Application No. PCT/JP2013/061198, filed Apr. 15, 2013, the contents of which are incorporated by reference to the present application in their entirety.

BACKGROUND

1. Technical Field

The present invention relates to a load transfer structure against a side impact by which an impact load to which a vehicle body is subjected from its side is received by a load receiving member disposed on a seatback frame.

2. Related Art

Known is a load transfer structure against a side impact by which an impact load due to a side impact to a vehicle is received by a load receiving member disposed on a seatback frame and then transferred to an inside of a vehicle cabin. Japanese Unexamined Patent Publication No. 2011-25827-discloses a load transfer structure like this. In the load transfer structure, when a side wall of a vehicle body receives an impact load and is moved to an inside of a vehicle cabin, the impact load is transferred (distributed) from a load receiving member constructed by steel pipes to an opposite-side side wall of the vehicle body through a center tunnel, and absorbed by an entire of the vehicle body.

SUMMARY OF INVENTION

In the load transfer structure, the load receiving member disposed on the seatback frame includes a horizontal portion, and an inclined portion extended obliquely upward from an outer end of the horizontal portion. By extending the inclined portion obliquely upward, an outer end of the inclined portion is located at an appropriate height for receiving the impact load. The impact load received by the outer end of the inclined potion (kinetic energy of the side impact) is absorbed by an entire of the vehicle body as explained above. However, in the load transfer structure, a reinforcing plate made of a steel plate is disposed on a bent portion, and thereby bending rigidity of the load receiving member is made high for the impact load transfer. Therefore, buckling distortion might occur in the inclined portion located on an outer side from the reinforced bent portion when the load receiving member receives the impact load. If buckling distortion occurs in the inclined portion, it becomes impossible to transfer the impact load and absorb it by an entire of the vehicle body, so that an intrusion stroke of a pillar becomes large and an energy amount absorbed by the load receiving member reduces. In addition, the energy is absorbed also by bent deformation of the load receiving member during its load transfer process. However, if bent deformation doesn't occurs but buckling distortion occurs, it becomes impossible to transfer the impact load and absorb it by an entire of the vehicle body, so that an intrusion stroke of a pillar becomes large and an energy amount absorbed by the load receiving member reduces.

One or more embodiments of the present invention provides a load transfer structure against a side impact that can increase an energy amount absorbed by a load receiving member disposed on a seatback frame when receiving an impact road caused by a side impact.

An aspect of the present invention provides a load transfer structure against a side impact, the structure comprising: a seatback frame; and a load receiving member disposed on the seatback frame to contact with a side wall of a vehicle body and to receive an impact load when the side wall of the vehicle body is moved toward a vehicle cabin by a side impact, wherein the load receiving member includes a horizontal portion extending laterally, an inclined portion extended obliquely outward and upward from an outer end of the horizontal portion, and a curved portion that is provided between the horizontal portion and the inclined portion and whose inner edge and outer edge are formed as concave edges, respectively, and a bisector of an angle between straight edges continued from both ends of the outer concave edge and a bisector of an angle between straight edges continued from both ends of the inner concave edge intersect with each other in the curved portion. Note that the "outer (outward)" means a direction from a center line of the vehicle body to the side wall of the vehicle body/a side of the side wall of the vehicle body to a center line of the vehicle body. Namely, the "movement of the side wall of the vehicle body to an inside of a vehicle cabin due to the side impact" is an inward movement of the side wall of the vehicle body.

DETAILED DESCRIPTION OF-EMBODIMENTS

Hereinafter, embodiments of the present invention will be explained with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Note that only a left side of a vehicle body is shown in FIGS. 1 to 4 and following explanations will be made with respect to only the left side of the vehicle body. However, a right side of the vehicle body has the same structure symmetrically.

Figure 1:
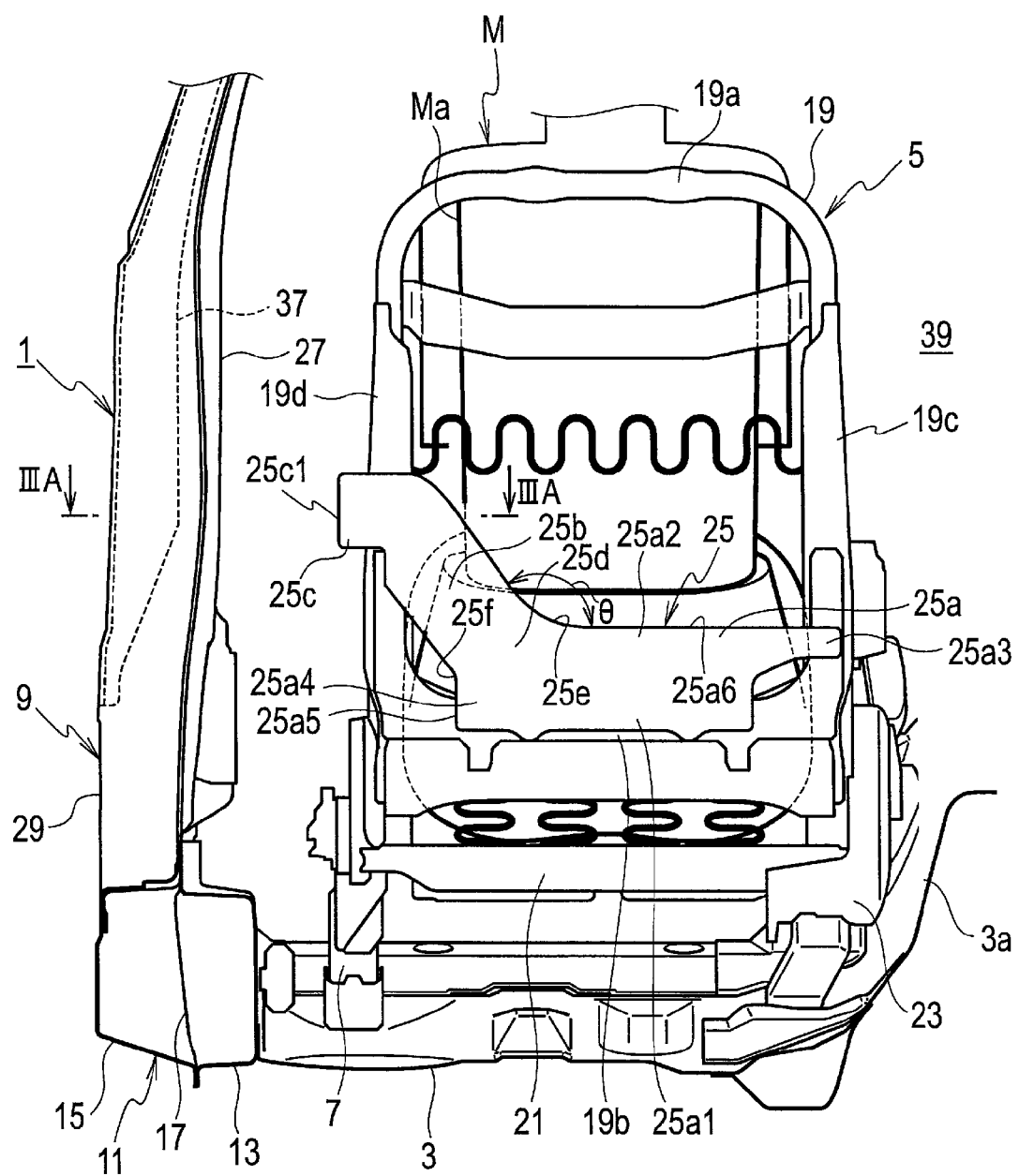
FIG. 1 is a rear view of a left half of a vehicle body including a load transfer structure against a side impact according to an embodiment (the vehicle body is shown as a cross-sectional view).

As shown in FIG. 1, a seat 5 is mounted on a floor panel 3 of a vehicle body 1 by interposing a seat slide mechanism 7 therebetween. The seat 5 can slide backward and forward on the seat slide mechanism 7. A center pillar 9 that is a part of a side wall of the vehicle body 1 is extended vertically on a laterally outer side of the seat 5 (left side in FIG. 1). There is a front door on a front side of the center pillar 9, and there is a rear door or a side panel on a rear side of the center pillar 9.

A side sill 11 is joined with a side edge of the floor panel 3, and the center pillar 9 is extended upward from an upper face of the side sill 11. The side sill 11 includes an inner sill 13, an outer sill 15, and a reinforcement 17. The reinforcement 17 is fixed between the inner sill 13 and the outer sill 15. A center tunnel 3a bulging upward is formed at a center portion of a floor on a laterally inner side of the floor panel 3 (right side in FIG. 1).

The seat 5 is shown by only its frame members, and its fabric materials and cushion materials are not shown. The seat 5 includes a seatback frame 19, and a seat cushion frame 21. The seatback frame 19 can swing backward and forward relative to the seat cushion frame 21 by a reclining mechanism 23.

The seatback frame 19 includes an upper lateral member 19a, a lower lateral member 19b, an inner vertical member 19c that links inner ends of the upper lateral member 19a and the lower lateral member 19b, and an outer vertical member 19d that links outer ends of the upper lateral member 19a and the lower lateral member 19b.

A load transfer member 25 served as a load receiving member is attached to a lower rear portion of the seatback frame 19. The load transfer member 25 includes a horizontal portion 25a extending laterally, and an inclined portion 25b extended obliquely outward and upward from an outer end of the horizontal portion 25a. An angle θ between the horizontal portion 25a and the inclined portion 25b is made obtuse.

The load transfer member 25 is made up of a planar member. The planar member may be a flat panel, but may be a wavy panel on whose surface embosses or ribs are formed.

The horizontal portion 25a is fixed with the seatback frame 19 by overlapping its lower edge 25a1 on the lower lateral member 19b and overlapping its protruded end 25a3 protruded laterally inward from its upper edge 25a2 on a lower portion of the inner vertical member 19c of the seatback frame 19.

Its lower side edge 25a5 of its laterally outer end 25a4 is located on a laterally inner side from the outer vertical member 19d of the seatback frame 19, and located on a laterally outer side from a laterally outer end Ma of a chest of an occupant M sitting on the seat 5. The lower side edge 25a5 is extended to a lower edge of the inclined portion 25b.

An upper end of the inclined portion 25b is continued to an upper-end horizontal portion 25c that is extended laterally outward slightly beneath a vertical center of the outer vertical member 19d of the seatback frame 19. The upper-end of the inclined portion 25b is overlapped on the outer vertical member 19d of the seatback frame 19, and fixed with the seatback frame 19, as shown in FIG. 3B that is a cross-sectional view taken along a line IIIB-IIIB shown in FIG. 2. The upper-end horizontal portion 25c is protruded laterally outward from the outer vertical member 19d of the seatback frame 19. A constant distance is made between an end edge 25c1 of the protruded upper-end horizontal portion 25c and the center pillar 9.

Figure 2:
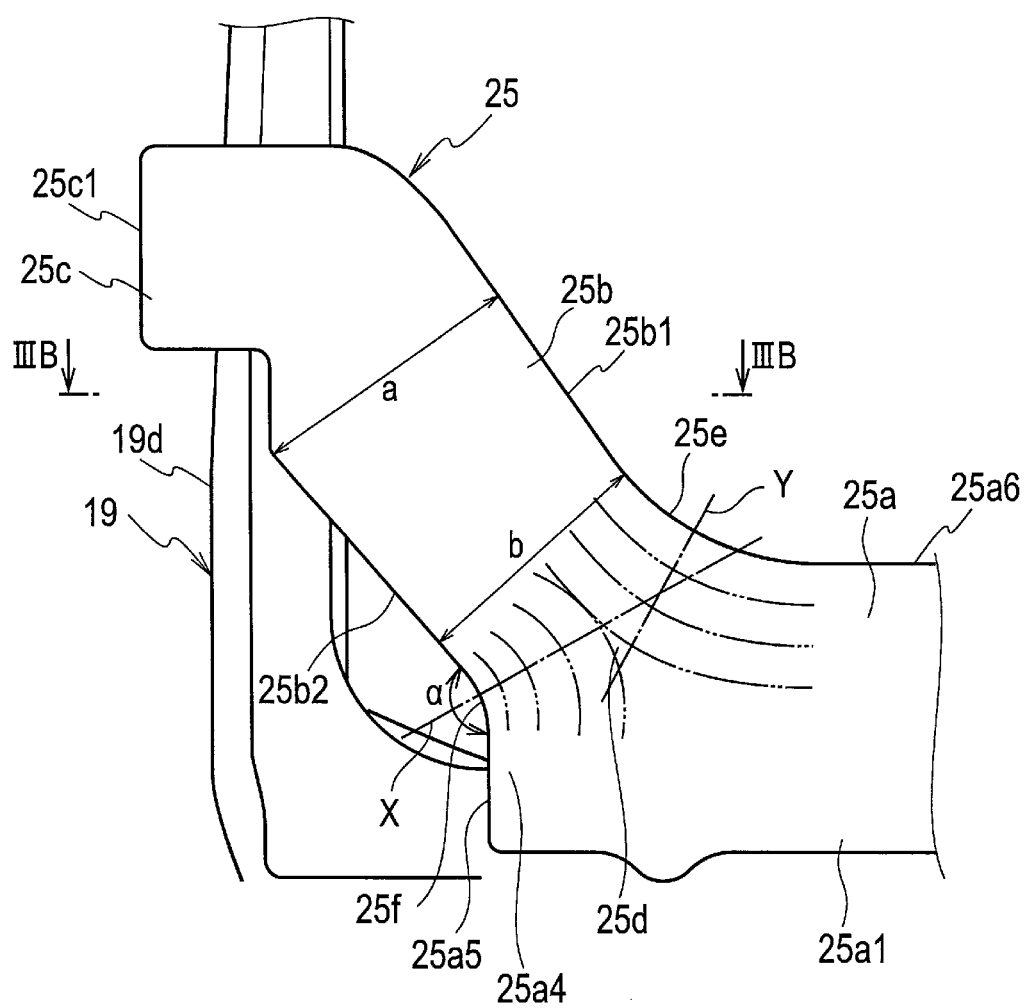
FIG. 2 is a rear view showing a main portion of a load receiving member in the load transfer structure.
Figure 3:
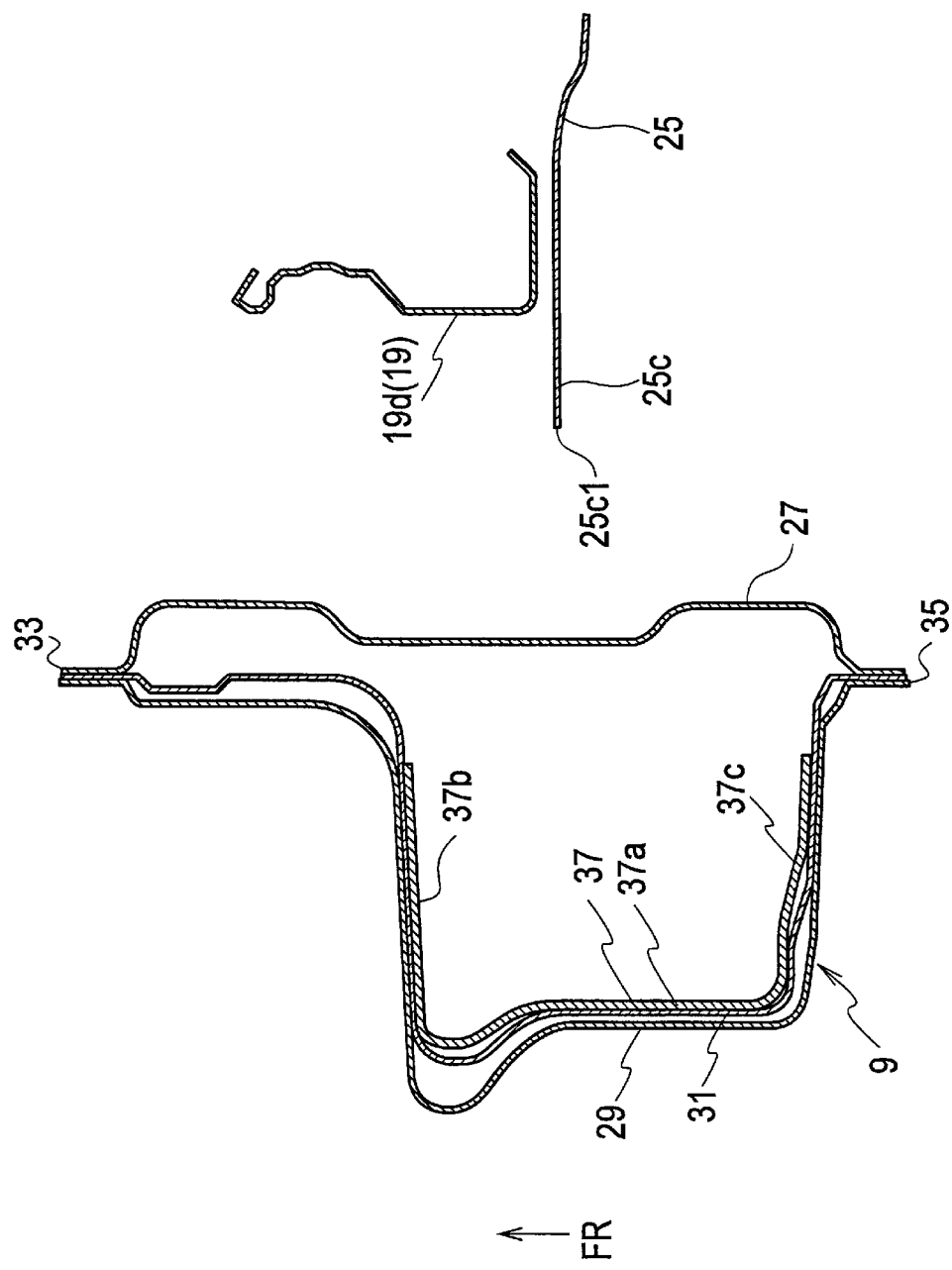
FIG. 3A is a cross-sectional view taken along a line IIIA-IIIA in FIG. 1.
FIG. 3B is a cross-sectional view taken along a line IIIB-IIIB in FIG. 2.

The horizontal portion 25a has an almost constant vertical width along its extending direction (lateral direction) with the exception of its protruded end 25a3. On the other hand, in the inclined portion 25b as shown in FIG. 2, its width a near the upper-end horizontal portion 25c is made slightly wider than its width b near the horizontal portion 25a (a>b), wherein the widths are dimensions of the inclined portion 25b taken perpendicular to the extending direction of the inclined portion. The width of the inclined portion 25b is made gradually narrowed from its width a portion to its width b portion. Each of the widths a and b is a width in a flat plane (sheet surface of FIG. 2) including the horizontal portion 25a and the inclined portion 25b of the load transfer member 25.

An inner edge of a curved portion 25d between the horizontal portion 25a and the inclined portion 25b forms a concave edge 25e. An inner end (a lower end) of the concave edge 25e continues to an upper edge 25a6 of the horizontal portion 25a, and an outer end (an upper end) of the concave edge 25e continues to an upper edge 25b1 of the inclined portion 25b.

An outer edge of the curved portion 25d also forms a concave edge 25f. A lower end (an inner end) of the concave edge 25f continues to the lower side edge 25a5 of the horizontal portion 25a, and an upper end (an outer end) of the concave edge 25f continues to a lower edge 25b2 of the inclined portion 25b. Namely, the outer concave edge 25f of the curved portion 25d is formed in the inclined portion 25b located on an outer side from the laterally outer end 25a4 of the horizontal portion 25a.

The concave edge 25e on the inner side and the concave edge 25f on the outer side are arranged oppositely to each other. A bisector X of an angle α between straight edges (the lower side edge 25a5 and the lower edge 25b2) continued from both ends of the outer concave edge 25f passes over (intersects with) the inner concave edge 25e. In addition, the bisector X and a bisector Y of the angle θ (see FIG. 1) between straight edges (the upper edge 25a6 and the upper edge 25b1) continued from both ends of the concave edge 25e intersect with each other in the curved portion 25d.

In FIG. 1 and FIGS. 3A-3B, a reclining position of a seatback of the seat 5 is adjusted according to a seating position of the occupant M. With this reclining position, the upper-end horizontal portion 25c of the load transfer member 25 is located just beside the center pillar 9.

As shown in a cross-sectional plan view in FIGS. 3A-3B, the center pillar 9 has an inner pillar 27 located just beside the upper-end horizontal portion 25c (in the above-mentioned reclining position), and an outer pillar 29 located on an outer side. An outer reinforcement 31 is disposed along an inner surface of the outer pillar 29. Front and rear edges 33 and 35 of the inner pillar 27, the outer pillar 29 and the outer reinforcement 31 are joined so as to form flanges, and thereby the center pillar 9 forms a closed cross-section.

Further, an inner reinforcement 37 having a shape fitted with a shape of the outer reinforcement 31 is provided on an inner side of the outer reinforcement 31. The inner reinforcement 37 is configured to include a side panel 37a a front panel 37b bent inward from a front edge of the side panel 37a, and a rear panel 37c bent inward from a rear edge of the side panel 37a, and an inner side of the inner reinforcement 37 is opened. Note that an arrow FR shown in FIG. 3A indicates a front of a vehicle.

As shown in FIG. 1, leastwise near a lateral position to the upper-end horizontal portion 25c of the load transfer member 25, lateral widths of the front panel 37b and the rear panel 37c are made wide, and thereby strength of the inner reinforcement 37 near the above-explained lateral position is made high. In addition, the lateral widths of the front panel 37b and the rear panel 37c is made gradually narrow beneath the above-explained lateral position, and the inner reinforcement 37 is not provided near the side sill 11 positioned at a lower position.

Next, deformations of the vehicle body 1 at a side impact and load transfer by the load transfer member 25 will be explained.

Figure 4:
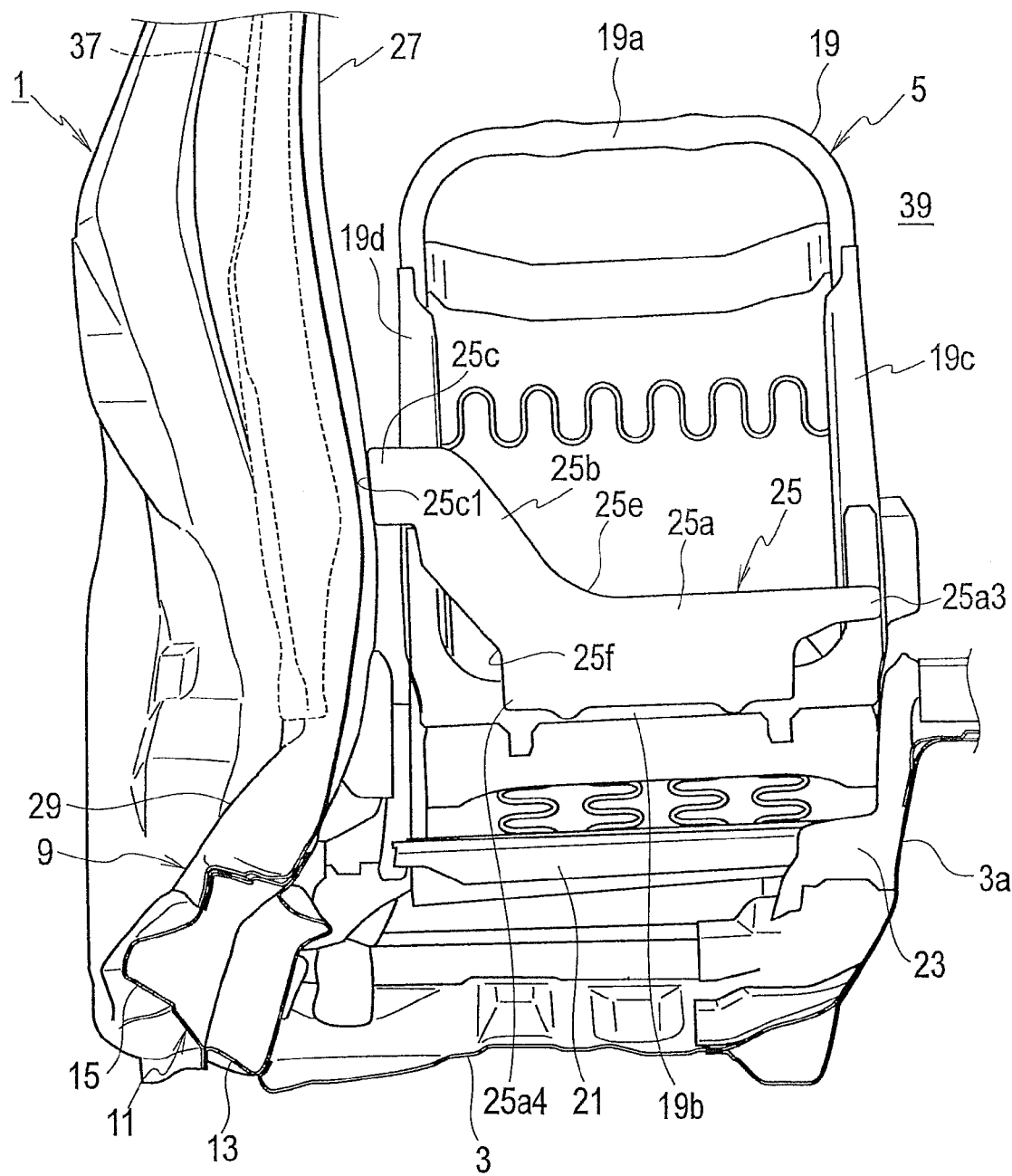
FIG. 4 is a rear view of the vehicle body at a side impact.

As shown in FIG. 4, when the vehicle body 1 near the center pillar 9 laterally receives an impact load, a side wall including the center pillar 9 is moved toward a vehicle cabin 39. The center pillar 9 (the side wall) contacts with the load transfer member 25 (the end edge 25c1 of the upper-end horizontal portion 25c) by this movement, and thereby the load transfer member 25 receives an impact load through the center pillar 9.

Here, in the load transfer member 25 according to the present embodiment, both edges of the curved portion 25d (See FIG. 2) are formed as the concave edge 25e and the concave edge 25f, and the bisector X to which (stress by) the impact load to the outer concave edge 25f concentrates and the bisector Y to which (stress by) the impact load to the inner concave edge 25e concentrates intersect with each other in the curved portion 25d. Therefore, the stress tends to concentrate to the curved portion 25d, and thereby buckling in the middle of the inclined portion 25b can be suppressed. As a result, in the load transfer member 25, buckling distortion doesn't occur at the inclined portion 25b, but bent deformation occurs at the curved portion 25d, and thereby an absorbed energy amount by the load transfer member 25 increases.

Stress distribution at an outer side of the curved portion 25d presents a pattern like ripples spread from the concave edge 25f in normal-line (bisector X) directions of the concave edge 25f, as shown by dashed-two dotted lines in FIG. 2. Similarly, stress distribution at an inner side of the curved portion 25d presents a pattern like ripples spread from the concave edge 25e in normal-line (bisector Y) directions of the concave edge 25e, as shown by dashed-two dotted lines in FIG. 2. Here, tensile stress applies to the outer side (concave edge 25f) of the curved portion 25d, and compressive stress applies to the inner side (concave edge 25e) of the curved portion 25d.

In these manners, the stress by the impact load concentrates to the curved portion 25d, and thereby buckling distortion in the middle of the inclined portion 25b is suppressed and the curved portion 25d bends to absorb the impact load (the kinetic energy of the side impact). Although the stress tends to concentrate to the curved portion 25d, its outer concave edge 25f having a convex shape can prolong time for receiving the load by the inclined portion 25b while suppressing bend in the curved portion 25d to some extent in comparison with a case of having a convex shape.

Namely, the load transfer member 25 bends at its curved portion 25d when receiving an impact load, and thereby receives the impact load at its inclined portion 25b for a longer time. As a result, intrusion of the center pillar 9 toward the vehicle cabin 39 can be suppressed, and thereby the occupant M can be protected.

In addition, as explained above, in the flat plane including the horizontal portion 25a and the inclined portion 25b of the load transfer member 25, the width a near the upper-end horizontal portion 25c (an opposite end to the horizontal portion 25a) of the inclined portion 25b is made wider than the width b of another end of the inclined portion 25b on a side of the horizontal portion 25a. Therefore, the rigidity of the curved portion 25d becomes smaller than rigidity of the inclined portion 25b positioned above, and thereby buckling distortion in the middle of the inclined portion 25b can be suppressed surely and the impact load (the kinetic energy of the side impact) can be absorbed by bending deformation of the curved portion 25d.

In addition, the lower side edge 25a5 of the load transfer member 25 is located on a laterally outer side from the laterally outer end Ma of a chest of the occupant M sitting on the seat 5. The horizontal portion 25a including the lower side edge 25a5 is fixed with the lower lateral member 19b of the seatback frame 19. Therefore, deformation of the horizontal portion 25a is suppressed even when it receives an impact load, and the horizontal portion 25a resists the impact load at its part near the lower side edge 25a5. As a result, a chest of the occupant M can be protected by the load transfer member 25.

In addition, the outer concave edge 25f of the load transfer member 25 is formed in the inclined portion 25b located on an outer side from the laterally outer end 25a4 of the horizontal portion 25a. Therefore, the load transfer member 25 can be bent surely at its curved portion 25d.

The upper-end horizontal portion 25c is a load receiving portion for contacting with the center pillar 9 that is a part of the side wall of the vehicle body 1 to receive a load. The upper-end horizontal portion 25c is a portion nearest to the center pillar 9 when the center pillar 9 laterally receives an impact load and then is moved toward the vehicle cabin 39, and resists the movements of the center pillar 9 toward the vehicle cabin 39. Namely, the upper-end horizontal portion 25c corresponds to a maximum intrusion position of the center pillar 9 when the center pillar 9 laterally receives an impact load and then is moved toward the vehicle cabin. Therefore, the intrusion of the center pillar 9 toward the vehicle cabin 39 can be suppressed more effectively by the load transfer member 25, and thereby the occupant M can be protected.

Note that the load transfer member 25 transfers an impact load by an side impact to the center tunnel 3a through the seat frame (the seatback frame 19 and the seat cushion frame 21) while bending (without buckling) at its curved portion 25d and absorbing the kinetic energy of the side impact as explained above. The impact load (the kinetic energy of the side impact) transferred to the center tunnel 3a is further transferred (distributed) to an opposite-side side wall of the vehicle body and absorbed by an entire of the vehicle body.

Although the invention has been described above by reference to certain embodiments of the invention, the invention is not limited to the embodiments described above. Scope of the invention should be defined in view of Claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A load transfer structure against a side impact, the structure comprising:
   a seatback frame; and
   a load receiving member disposed on the seatback frame to contact with a side wall of a vehicle body and to receive an impact load when the side wall of the vehicle body is moved toward a vehicle cabin by a side impact, wherein
   the load receiving member includes a horizontal portion extending laterally, an inclined portion extended obliquely outward and upward from an outer end of the horizontal portion, and a curved portion that is provided between the horizontal portion and the inclined portion and whose inner edge and outer edge are formed as concave edges, respectively, and
   a bisector of an angle between straight edges continued from both ends of the outer concave edge and a bisector of an angle between straight edges continued from both ends of the inner concave edge intersect with each other in the curved portion.

2. The load transfer structure against a side impact according to claim 1,
   wherein a load receiving portion of the load receiving member that is to contact with the side wall of the vehicle body is a portion nearest to the side wall of the vehicle body that is to be moved toward the vehicle cabin by a side impact.

3. The load transfer structure against a side impact according to claim 1,
   wherein a load receiving portion of the load receiving member that is to contact with the side wall of the vehicle body is a portion nearest to the side wall of the vehicle body in the load transfer structure.

4. The load transfer structure against a side impact according to claim 1,
wherein, in a flat plane including the horizontal portion and the inclined portion, a width of an end of the inclined portion on a side of the horizontal portion is made narrower than a width of another end of the inclined portion on an opposite side to the horizontal portion.

5. The load transfer structure against a side impact according to claim 4,
wherein a load receiving portion of the load receiving member that is to contact with the side wall of the vehicle body is a portion nearest to the side wall of the vehicle body that is to be moved toward the vehicle cabin by a side impact.

6. The load transfer structure against a side impact according to claim 4,
wherein a load receiving portion of the load receiving member that is to contact with the side wall of the vehicle body is a portion nearest to the side wall of the vehicle body in the load transfer structure.

7. A load transfer structure against a side impact, the structure comprising:
a seatback frame; and
a load receiving member disposed on the seatback frame to contact with a side wall of a vehicle body and to receive an impact load when the side wall of the vehicle body is moved toward a vehicle cabin by a side impact, wherein
the load receiving member includes a horizontal portion extending laterally, an inclined portion extended obliquely outward and upward from an outer end of the horizontal portion, and a curved portion that is provided between the horizontal portion and the inclined portion and whose inner edge and outer edge are formed as concave edges, respectively, and
a bisector of an angle between straight edges continued from both ends of the outer concave edge and a bisector of an angle between straight edges continued from both ends of the inner concave edge intersect with each other in the curved portion,
wherein the horizontal portion is fixed with a lower portion of the seatback frame,
wherein the other end of the inclined portion on the opposite side is fixed with a side portion of the seatback frame, and
wherein an outer end of the horizontal portion is located on a laterally outer side from a chest of an occupant sitting on a seat that includes the seatback frame.

8. The load transfer structure against a side impact according to claim 7,
wherein a load receiving portion of the load receiving member that is to contact with the side wall of the vehicle body is a portion nearest to the side wall of the vehicle body that is to be moved toward the vehicle cabin by a side impact.

9. The load transfer structure against a side impact according to claim 7,
wherein a load receiving portion of the load receiving member that is to contact with the side wall of the vehicle body is a portion nearest to the side wall of the vehicle body in the load transfer structure.

10. The load transfer structure against a side impact according to claim 7,
wherein the outer concave edge of the load receiving member is formed in the inclined portion located on an outer side from the outer end of the horizontal portion.

11. The load transfer structure against a side impact according to claim 10,
wherein a load receiving portion of the load receiving member that is to contact with the side wall of the vehicle body is a portion nearest to the side wall of the vehicle body that is to be moved toward the vehicle cabin by a side impact.

12. The load transfer structure against a side impact according to claim 10,
wherein a load receiving portion of the load receiving member that is to contact with the side wall of the vehicle body is a portion nearest to the side wall of the vehicle body in the load transfer structure.

13. A load transfer structure against a side impact, the structure comprising:
a seatback frame; and
a load receiving member disposed on the seatback frame to contact with a side wall of a vehicle body and to receive an impact load when the side wall of the vehicle body is moved toward a vehicle cabin by a side impact, wherein
the load receiving member includes a horizontal portion extending laterally, an inclined portion extended obliquely outward and upward from an outer end of the horizontal portion, and a curved portion that is provided between the horizontal portion and the inclined portion and whose inner edge and outer edge are formed as concave edges, respectively, and
a bisector of an angle between straight edges continued from both ends of the outer concave edge and a bisector of an angle between straight edges continued from both ends of the inner concave edge intersect with each other in the curved portion,
wherein, in a flat plane including the horizontal portion and the inclined portion, a width of an end of the inclined portion on a side of the horizontal portion is made narrower than a width of another end of the inclined portion on an opposite side to the horizontal portion,
wherein the horizontal portion is fixed with a lower portion of the seatback frame,
wherein the other end of the inclined portion on the opposite side is fixed with a side portion of the seatback frame, and
wherein an outer end of the horizontal portion is located on a laterally outer side from a chest of an occupant sitting on a seat that includes the seatback frame.

* * * * *